(12) United States Patent
Jiang

(10) Patent No.: US 11,019,119 B2
(45) Date of Patent: May 25, 2021

(54) WEB-BASED LIVE BROADCAST

(71) Applicant: Shanghai Bilibili Technology Co., Ltd., Shanghai (CN)

(72) Inventor: Jun Jiang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 16/206,428

(22) Filed: Nov. 30, 2018

(65) Prior Publication Data
US 2019/0166171 A1 May 30, 2019

(30) Foreign Application Priority Data

Nov. 30, 2017 (CN) .......................... 201711235840.6

(51) Int. Cl.
*G06F 15/16* (2006.01)
*H04L 29/06* (2006.01)
(Continued)

(52) U.S. Cl.
CPC ........ *H04L 65/4076* (2013.01); *G06F 16/958* (2019.01); *H04L 65/1033* (2013.01); *H04L 65/608* (2013.01); *H04L 67/02* (2013.01)

(58) Field of Classification Search
CPC ............. H04L 65/4076; H04L 65/1033; H04L 65/608; H04L 67/02; H04L 65/4069;
(Continued)

(56) References Cited

U.S. PATENT DOCUMENTS 7,809,773 B2 10/2010 Horowitz et al.
8,019,815 B2 9/2011 Keener et al.
(Continued)

FOREIGN PATENT DOCUMENTS

CN 105049912 A 11/2015
CN 105407369 A 3/2016
(Continued)

OTHER PUBLICATIONS

Tomasz Bujlow, As Survey on Web Tracking: Mechanism, Implications and Defences, 2017, IEEE Explore, vol. 105 Issue 8 (Year: 2017).*

(Continued)

*Primary Examiner* — Oscar A Louie
*Assistant Examiner* — Oluwatosin M Gidado
(74) *Attorney, Agent, or Firm* — BakerHostetler

(57) ABSTRACT

Techniques for a web-based live broadcast in a network community are described herein. The disclosed techniques include a plurality of hosts each configured to capture content data using a HTML5 browser and transmit the content data via the HTML5 browser to a gateway server based on a WebRTC protocol; a gateway server configured to receive the content data from each of the plurality of hosts, convert the content data into streaming media data in a predetermined format, and transmit the streaming media data to a content distributor based on RTMP; and a plurality of clients each configured to receive the streaming media data from the content distributor based on HTTP, convert the predetermined format of the streaming media data into a format corresponding to each client and displayable on a corresponding client, and display the streaming media data.

9 Claims, 4 Drawing Sheets

(51) Int. Cl.
*G06F 16/958* (2019.01)
*H04L 29/08* (2006.01)

(58) Field of Classification Search
CPC ... H04L 65/60; H04L 67/2823; G06F 16/958; G06F 19/00; G06F 16/4393; G06F 16/986; G06F 3/0481
USPC .................................................. 709/231, 217
See application file for complete search history.

(56) References Cited

U.S. PATENT DOCUMENTS

| | | | |
|---|---|---|---|
| 8,376,910 | B2 | 2/2013 | Cheung et al. |
| 8,545,369 | B2 | 10/2013 | Cheung et al. |
| 8,555,177 | B1 | 10/2013 | Junee et al. |
| 8,628,414 | B2 | 1/2014 | Walker et al. |
| 8,701,153 | B2 | 4/2014 | Abrams |
| 8,782,721 | B1 * | 7/2014 | Kellicker ....... H04N 21/234336 348/468 |
| 9,003,306 | B2 | 4/2015 | Mehin et al. |
| 9,253,225 | B1 | 2/2016 | Junee et al. |
| 9,332,315 | B2 | 5/2016 | Agrawal |
| 9,467,408 | B1 | 10/2016 | Sherman-Presser et al. |
| 2009/0249223 | A1 | 10/2009 | Barsook et al. |
| 2012/0331496 | A1 | 12/2012 | Copertino et al. |
| 2013/0286211 | A1 * | 10/2013 | Cao ....................... H04N 7/181 348/159 |
| 2013/0326352 | A1 | 12/2013 | Morton |
| 2014/0012910 | A1 | 1/2014 | White |
| 2014/0013200 | A1 | 1/2014 | White |
| 2014/0081435 | A1 | 3/2014 | Wagner |
| 2014/0089801 | A1 | 3/2014 | Agrawal |
| 2014/0092127 | A1 | 4/2014 | Kruglick |
| 2014/0215541 | A1 * | 7/2014 | Horen ..................... G06F 16/40 725/109 |
| 2014/0371894 | A1 * | 12/2014 | Shan ........................ G06F 3/165 700/94 |
| 2015/0039996 | A1 * | 2/2015 | Kwon .................. G06F 17/2247 715/234 |
| 2015/0082342 | A1 | 3/2015 | Norwood et al. |
| 2015/0095643 | A1 * | 4/2015 | Adams ................ G06F 21/6218 713/165 |
| 2015/0261853 | A1 | 9/2015 | Shao |
| 2016/0316272 | A1 | 10/2016 | Li |
| 2016/0342287 | A1 | 11/2016 | Barker et al. |
| 2017/0013040 | A1 * | 1/2017 | Ponekker .............. H04L 65/605 |
| 2018/0048831 | A1 * | 2/2018 | Berwick ............ H04N 5/23218 |
| 2019/0018505 | A1 * | 1/2019 | Cherukuri .......... G02B 27/0101 |

FOREIGN PATENT DOCUMENTS

| | | | | |
|---|---|---|---|---|
| CN | 105656910 | A | 6/2016 | |
| CN | 105933375 | A | 9/2016 | |
| CN | 106131583 | A | 11/2016 | |
| CN | 106453289 | A | 2/2017 | |
| CN | 106454404 | A | 2/2017 | |
| CN | 106506632 | A | 3/2017 | |
| CN | 106791894 | A | 5/2017 | |
| CN | 106792098 | A | 5/2017 | |
| CN | 107027048 | A | 8/2017 | |
| EP | 3070587 | B1 * | 8/2019 | ........... G06F 3/0481 |
| WO | WO-2008024777 | A2 * | 2/2008 | ............. G09B 5/062 |

OTHER PUBLICATIONS

HTML5 based media player for real-time video surveillance Guolei Zhu;Fang Zhang;Wei Zhu;Yayu Zheng 2012 5th International Congress on Image and Signal Processing (Year: 2012).*

"Bilibili / flv.js"; https://github.com/bilibili/flv.js; GitHub, Inc.; © 2019; accessed Jan. 7, 2019; 5 pages.

* cited by examiner

WEB-BASED LIVE BROADCAST

CROSS-REFERENCE TO RELATED APPLICATION

The present application claims priority of Chinese patent application No. 201711235840.6, filed on Nov. 30, 2017. The entire disclosure of the above-identified application is hereby incorporated by reference herein and made a part of this specification.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

The existing network broadcast mainly adopts the Real-Time Messaging Protocol (RTMP) pushing streaming technology, and RTMP is a real-time message transmission protocol proposed by the Macromedia Company, and is used to transmit audios, videos and other data through the network between a Flash player and a server. This protocol is used when the anchors of the current popular live broadcasting platforms, such as Bilibili live broadcasting platform, push video streaming. Although the RTMP protocol supports multimedia streaming broadcasting, in practice, the player terminal usually uses the Hyper Text Transfer Protocol (HTTP) protocol to obtain multimedia streaming.

Now based on the RTMP pushing streaming technology, there are more mature PC pushing streaming solutions, mobile phone pushing streaming solutions, game host platform solutions and even hardware solutions provided for audio and video recording equipments, but there is no browser solution yet. This leads to the fact that all live broadcasting platforms require users to use client software for live broadcasting. Mobile phones need to install separate Apps, and computers need to use general live broadcasting software (such as OBS, etc.) or dedicated live broadcasting software to start live broadcast, resulting in that the realization means of live broadcasting is rather complicated.

On the other hand, the Web Real-Time Communication (WebRTC) protocol is composed of a set of communication protocols and application programming interfaces, which provides means of establishing connections between users (P2P) and communicating information in real time. Hypertext Markup Language 5 (HTML5) browsers can easily utilize WebRTC for video chatting without plug-ins installed additionally.

Although the WebRTC system can allow two users to directly use browsers for audio and video calls without installing separate clients, it is unable to be connected into the existing content distribution networks based on the RTMP protocol. So it is also difficult to use HTML5 browsers to realize the webcast function.

The present disclosure provides a convenient and fast network broadcasting platform based on HTML5 browser, which is convenient for users to use, while improving the user experience of live broadcasting. The techniques described in the present disclosure can implement live broadcasting with a browser and without installing any live broadcasting software, and the audience terminal can watch the live broadcasting conveniently with the client application or the client browser. At the same time, the present invention also supports a multi-anchor mode.

Figure 1:
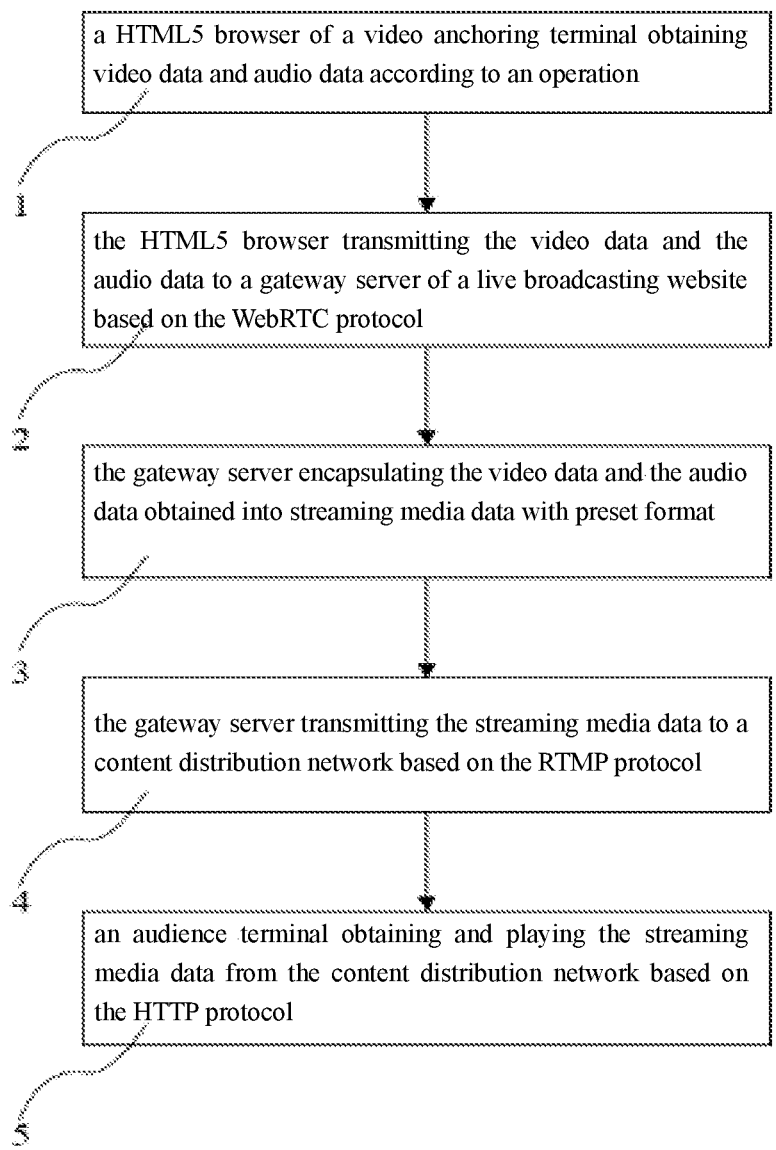
FIG. 1 is a flowchart illustrating an example process for implementing web-based live broadcast that may be used in accordance with the present disclosure.

FIG. 1 is a flowchart illustrating an example process of implementing live broadcast based on HTML5 browser in accordance with the present disclosure.

In one embodiment, the video anchoring method based on HTML5 browser comprises the following steps:

(1) a HTML5 browser of an anchoring terminal obtaining video data and audio data according to an operation;

(2) the HTML5 browser transmitting the video data and the audio data to a gateway server of a live broadcasting website based on the WebRTC protocol;

(3) the gateway server encapsulating the video data and the audio data obtained into streaming media data with preset format;

(4) the gateway server transmitting the streaming media data to a content distribution network based on the RTMP protocol;

(5) an audience terminal obtaining and playing the streaming media data from the content distribution network based on the HTTP protocol.

The present invention also provides a computer-readable storage medium in which a computer program is stored, which is carried out by a processor, to realize the video anchoring method based on HTML5 browser mentioned in the above-mentioned embodiment.

Figure 2:
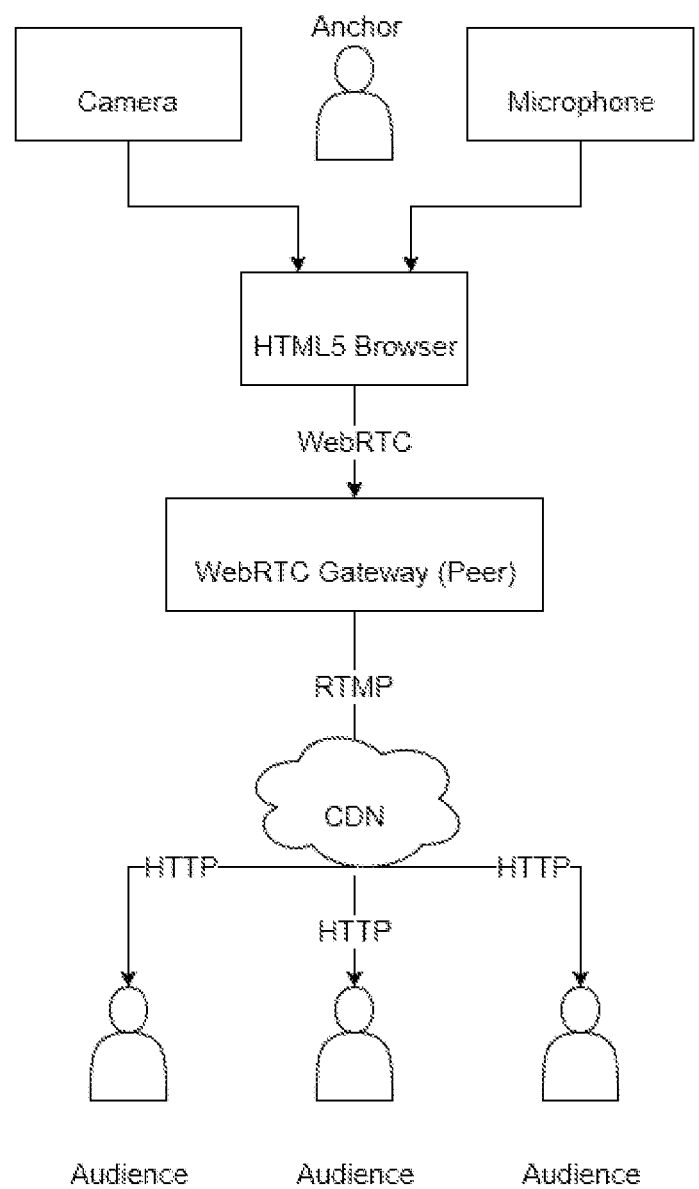
FIG. 2 is a schematic diagram of an example system for implementing web-based live broadcast that may be used in accordance with the present disclosure.
Figure 3:
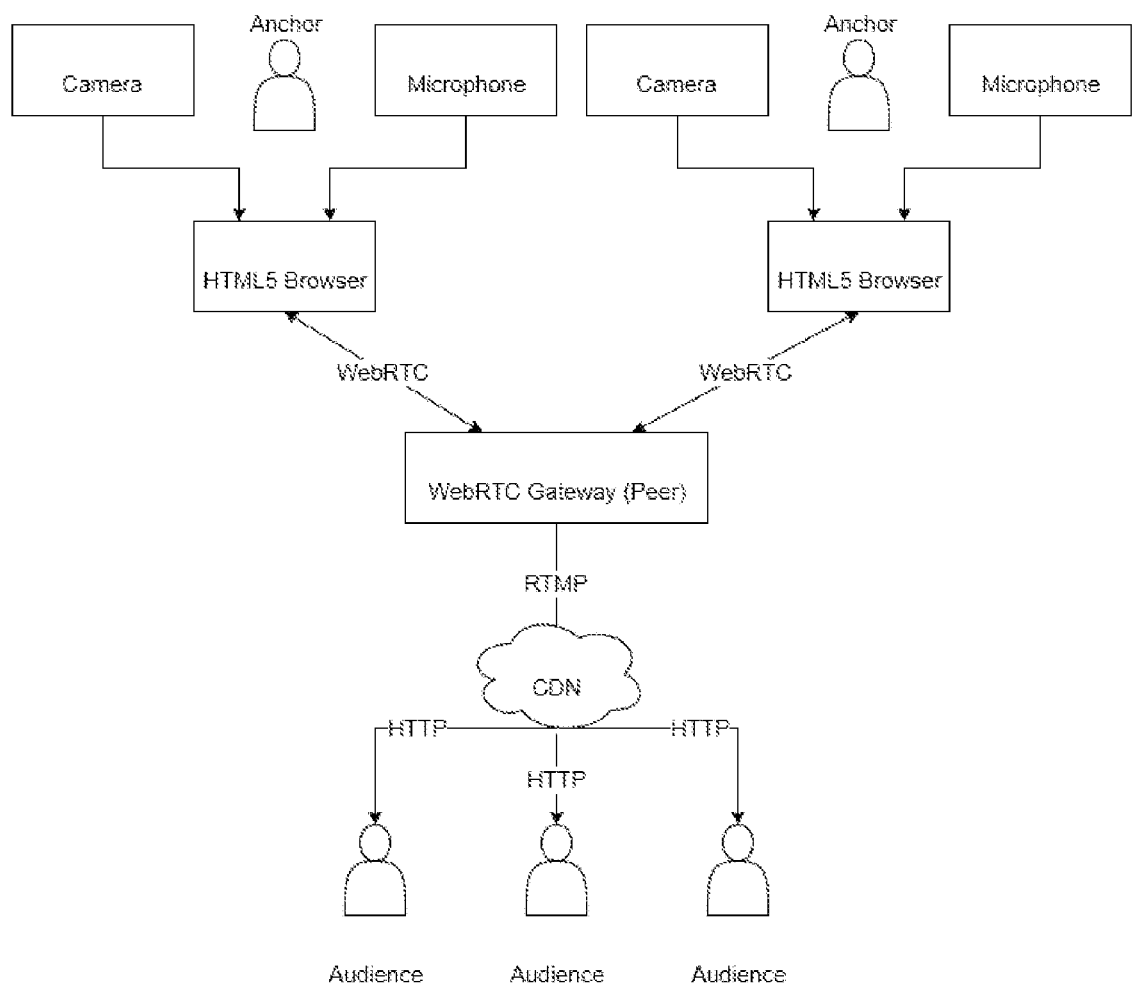
FIG. 3 is a schematic diagram of another example system for implementing web-based live broadcast that may be used in accordance with the present disclosure.

The present invention also provides a live video broadcasting system based on HTML5 browser, the system used to realize the live video broadcasting method based on HTML5 browser mentioned in the above-mentioned embodiment is shown in FIG. 2 and FIG. 3, including: a video anchoring terminal, a gateway server, a content distribution network and an audience terminal.

Wherein, the video anchoring terminal comprises a HTML5 browser, used to obtain video data and audio data with the HTML5 browser according to an operation; and the HTML5 browser transmits the video data and the audio data based on the WebRTC protocol;

the gateway server is provided in a live broadcasting website, and used to obtain the video data and the audio data; and encapsulate the video data and the audio data obtained into streaming media data with preset format; then transmit the streaming media data based on the RTMP protocol;

the content distribution network is used to obtain the video data and the audio data from the gateway server, and distribute them;

the audience terminal is used to obtain and play the streaming media data from the content distribution network based on the HTTP protocol.

In a preferred embodiment, Step (1) includes the following steps in detail:

(1-1) the video anchoring terminal opening the page of the live broadcasting website by using the HTML5 browser, which contains program codes calling the WebRTC facilities of the browser, according to the operation;

(1-2) the HTML5 browser prompting a request for obtaining picture data from a camera and voice data from a microphone;

(1-3) the HTML5 browser obtaining the picture data from the camera and the voice data from the microphone, according to the operation.

Step (5) includes the following steps in detail:

(5-1) the audience terminal entering into the live broadcasting website by using a client application or a client browser;

(5-2) the client application or the client browser obtaining the streaming media data from the content distribution network based on the HTTP protocol.

(5-3) the client application or the client browser converting the format of the streaming media data into a playable format corresponding to the client application or the client browser;

(5-4) the client application or the client browser playing the converted streaming media data.

The present invention also provides a computer-readable storage medium and a live video broadcasting system based on HTML5 browser used to realize the live video broadcasting method based on HTML5 browser mentioned in the above-mentioned preferred embodiment. A computer program stored in the computer-readable storage medium is carried out by a processor, to realize the live video broadcasting method based on HTML5 browser mentioned in the above-mentioned embodiment.

In the system used to realize the live video broadcasting method based on HTML5 browser mentioned in the above-mentioned preferred embodiment, the video anchoring terminal is further used to open the page of the live broadcasting website by using the HTML5 browser, which contains program codes calling the WebRTC facilities of the browser; the HTML5 browser is further used to prompt a request for obtaining picture data from a camera and voice data from a microphone; the video anchoring terminal is used to obtain the picture data from the camera and the voice data from the microphone by using the HTML5 browser according to the operation. The audience terminal is used to enter into the live broadcasting website by using a client application or a client browser; obtain the streaming media data from the content distribution network based on the HTTP protocol by using the client application or the client browser; convert the format of the streaming media data into a playable format corresponding to the client application or the client browser by using the client application or the client browser; play the converted streaming media data by using the client application or the client browser.

In a further preferred embodiment, the preset format is a Flash Video (FLV) format, and Step (5-3) includes in detail: the client application or the client browser converting the format of the streaming media data into the playable format corresponding to the client application or the client browser based on a program library of an HTML5 Flash Video Player written in pure JavaScript (FLV.JS).

The present invention also provides a computer-readable storage medium and a live video broadcasting system based on HTML5 browser used to realize the live video broadcasting method based on HTML5 browser mentioned in the above-mentioned further preferred embodiment. In the system, the preset format is the FLV format, and the step of converting the format of the streaming media data into a playable format corresponding to the client application or the client browser by using the client application or the client browser comprises in details: converting the format of the streaming media data into the playable format corresponding to the client application or the client browser based on a FLV.JS program library by using the client application or the client browser.

In a more preferred embodiment, at least two said video anchoring terminals are included, and Step (1) is:

(1') the HTML5 browsers of the at least two said video anchoring terminals obtaining corresponding video data and corresponding audio data, respectively, and the HTML5 browser of each of the video anchoring terminals plays the video data and the audio data obtained from other said video anchoring terminals, according to the operation;

Correspondingly Step (3) is:

(3') the gateway server transmitting the video data and the audio data obtained from one said video anchoring terminal to other said video anchoring terminals, and encapsulating all of the video data and the audio data obtained from the video anchoring terminals into the streaming media data with the preset format.

In the practical application, the video anchoring method, the live video broadcasting method, the video anchoring terminal and the live video broadcasting system based on HTML5 browser of the present invention have two implementations of one-anchor as shown in FIG. 2 and multi-anchor as shown in FIG. 3.

The one-anchor implementation mainly includes the following steps:

1. An anchor enters into a broadcasting page of a live broadcasting website, which contains program codes calling the WebRTC facilities of the browser.

2. The anchor begins live broadcasting, a program connects to the gateway server of the live broadcasting website through the WebRTC protocol, at the same time, it requests to the browser for picture data from a camera and voice data from a microphone. The browser displays a pop-up to prompt a user, after the user allows, the program can obtain the picture data from the camera and the voice data from the microphone. These data are transmitted to the gateway server of the live broadcasting website.

3. The gateway server encapsulates the video (the camera picture) data and the audio (the microphone voice) data into streaming media with FLV format, and pushes them into an existing streaming media content distribution network based on the RTMP protocol.

4. An audience enters into the live broadcasting website, the browser obtains the streaming media with FLV format from CDN through the HTTP protocol, and converts the format of the streaming media into a browser-recognizable format through a FLV.JS program library, and starts playing.

The multi-anchor (taking two anchors as an example) implementation mainly includes the following steps:

1. Two anchors enter into a broadcasting page of a live broadcasting website, respectively, which contains program codes calling the WebRTC facilities of the browser.

2. A program notifies a server that the two anchors will link their microphones.

3. The anchors begin live broadcasting, the program connects to the gateway server of the live broadcasting website through the WebRTC protocol, and pushes the microphone voice data and the camera picture data to the gateway server.(same to the one-anchor implementation)

4. The gateway server pushes the picture and the voice of Anchor A to Anchor B, and pushes the picture and the voice of Anchor B to Anchor A, at the same time, it decodes the pictures and the voices of Anchor A and Anchor B, splices the videos into a large video, and mixes the voices together (or one on the right and one on the left are spliced into a stereo audio, both are OK).

5. At this time, Anchor A can see the picture of Anchor B and hear the voice of Anchor B. Anchor B can see the picture of Anchor A and hear the voice of Anchor A.

6. On the gateway, after the spliced pictures and the mixed voices are encoded, they are encapsulated into streaming media data with FLV format, which is pushed into the existing streaming media content distribution network through the RTMP protocol.

7. An audience enters into the live broadcasting website, a browser obtains the streaming media data with FLV format from CDN through the HTTP protocol, and converts the format of the streaming media data into a browser-recognizable format through a FLV.JS program library, and starts playing.

The implementation of more anchors is similar to the implementation of two anchors mentioned above.

The object of the present invention is to connect WebRTC and multimedia content distribution networks with the existing WebRTC, RTMP protocol and multimedia content distribution network technologies on the premise of reusing the existing facilities as much as possible, so as to achieve the goal that the anchor performs the live broadcasting activity directly through the browser.

Wherein, the Multimedia Content Distribution Network: the Content Distribution Network (CDN) consists of geographically distributed proxy servers and data centers, provides highly available and high-performance services to the end users. Modern CDN has evolved from providing static content to supporting streaming media content distribution. CDN providers have supported streaming media transmission of RTMP protocol, and provided multimedia streaming to browsers through the HTTP protocol, at the same time, they also provide multimedia streaming to mobile terminals in the HLS form.

FLV.JS is an open source program library published by Bilibili on GitHub, and it can allow the browsers to play multimedia streaming with the FLV format directly. The playing delay of multimedia streaming with the FLV format is much less than that of the existing HLS streaming directly supported by the browsers.

Compared with the prior art, the present invention has the following characteristics:

1. Both the anchor and the user terminal just use the HTML5 browsers by transmitting non-P2P streaming media with the WebRTC facilities of the browsers, which is more convenient.

2. The gateway server that connects the WebRTC network and the RTMP network.

3. The microphone-linking gateway server that transparent transmits and merges two lines of WebRTC P2P streaming.

The advantages of the present invention are as follows:

1. The existing content distribution network services can be reused directly, the load capacity same to that of the existing mature facilities can be obtained directly without modifying the basic settings in a large scale. That is, the existing content distribution network system is easy to upgrade.

2. An anchoring terminal service is built based on a high abstraction layer such as HTML5, the core codes can be used across platforms, even are compatible with platforms that have not yet appeared. Browsers usually are implemented by highly efficient hardware encoding and decoding, which is friendly to energy consumption. That is, the cross platform capability is strong and the efficiency is high.

3. The gateway server acts as Peer (simulating video chat in WebRTC, that is, to realize video chat between the gateway server and the anchor), there is no need to use STUN, TURN, ICE and other services in the process of the connection establishment, the success rate of the connection is high and the extra cost is low. That is, the success rate of broadcasting is high.

4. The application scenarios of WebRTC often have high requirements to delay, so these characteristics can be directly utilized in the secondary development based on the existing frameworks. That is, the real-time is good.

5. The application scenario of WebRTC is bidirectional communication, which provides great convenience for the development of the anchor microphone-linking function.

6. In recent years, the browser technology and the ECMAScript programming language have developed rapidly, with the introduction of WebGL and other technologies, this live broadcasting method will have more and more functions. That is, the prospect for the future development is good.

7. System integration is easy. Because it is compatible with the existing content distribution networks, there are few special requirements for the existing systems of partners in business cooperation. That is, it does not affect future business cooperation that requires system integration.

8. The multimedia streaming is transmitted with the FLU encapsulation format, the direct playing in the HTML5 browser relies on the FLV.JS. It has a delay control capability far better than that of the HLS protocol.

With the video anchoring method, the live video broadcasting method, the video anchoring terminal and the live video broadcasting system based on HTML5 browser of the present invention, for in the video anchoring method, at first, after the video data and the audio data from the video anchoring terminal is obtained by using the HTML5 browser, the video data and the audio data are transmitted to the gateway server of the live broadcasting website based on the WebRTC protocol; then the gateway server encapsulates the video data and the audio data into the streaming media data, and furthermore transmits them to the content distribution network based on the RTMP protocol; after that, the audience terminal obtains and plays the streaming media data from the content distribution network. Therefore, the live video broadcasting method that can be implemented by the video anchoring terminal only with the browser and without installing any live broadcasting software is realized, and the audience terminal can watch the live broadcasting conveniently with the client application or the client browser. At the same time, the present invention also supports a multi-anchor mode. Thus, a more convenient and fast network broadcast platform is built, which is convenient for users to use, while improving the user experience of live broadcasting, and the video anchoring method, the live video broadcasting method, the video anchoring terminal and the live video broadcasting system based on HTML5 browser invented have simple application modes, low application costs, and very wide application scopes.

Figure 4:
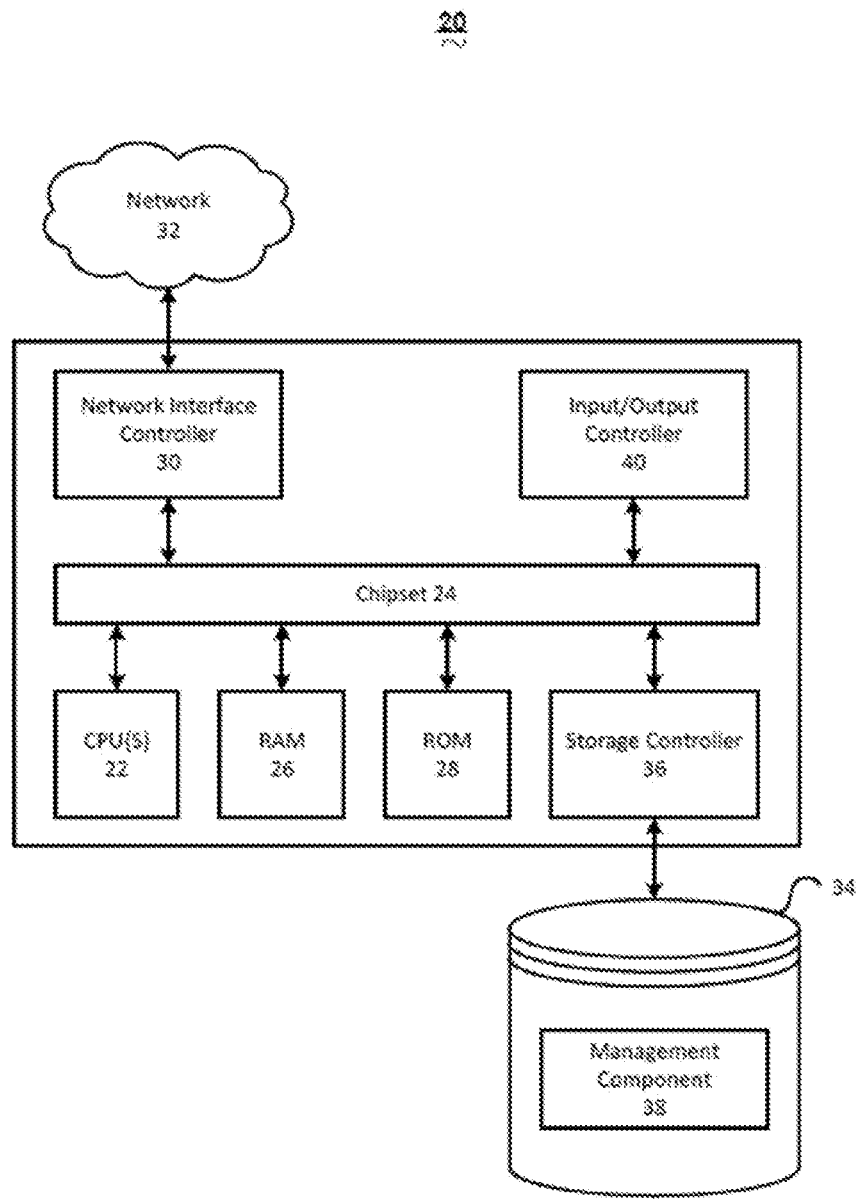
FIG. 4 is a schematic diagram illustrating an example computing device that may be used in accordance with the present disclosure.

FIG. 4 depicts a computing device that may be used in various aspects, such as the anchor(s) (i.e., host(s)), gateway, content distribution network, and/or audiences (i.e., clients) depicted in FIG. 2 and FIG. 3. With regard to the example architecture of FIG. 2 and FIG. 3, the host, gateway, content distribution network, and client may each be implemented by one or more an instances of a computing device 20 of FIG. 4. The computer architecture shown in FIG. 4 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 4, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 4, may also include an input/output controller 40 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 4, may include other components that are not explicitly shown in FIG. 4, or may utilize an architecture completely different than that shown in FIG. 4.

As described herein, a computing device may be a physical computing device. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for a web-based live broadcast in a network community comprising a plurality of hosts, a gateway server, a content distributor, and a plurality of clients, comprising:

capturing, by a first host, content data using a first Hypertext Markup Language 5 (HTML5) browser, wherein the first host is among the plurality of hosts, and the content data comprise video and audio data;

transmitting, by the first host, the content data via the first HTML5 browser to the gateway server based on a Web Real-Time Communication (WebRTC) protocol;

receiving, by the gateway server, the content data from the first host;

converting, by the gateway server, the content data into streaming media data in a predetermined format, wherein the predetermined format is a Flash Video (FLV) format;

transmitting, by the gateway server, the streaming media data to the content distributor based on a Real-Time Messaging Protocol (RTMP);

receiving, by the content distributor, the streaming media data;

distributing, by the content distributor, the streaming media data in the network community;

obtaining, by a first client, the streaming media data from the content distributor based on a Hyper Text Transfer Protocol (HTTP), wherein the first client is among the plurality of clients;

converting, by the first client itself, the predetermined format of the streaming media data into a format that is displayable on the first client, wherein the first client uses a program library of an HTML5 Flash Video Player in JavaScript (FLV.JS) to convert the predetermined format of the streaming data into the format that is displayable on the first client; and displaying, by the first client, the streaming media data.

2. The method of claim 1, further comprising:

accessing, by the first host via the first HTML5, a webpage of a live broadcast website, the webpage comprising instructions for calling a WebRTC facility of the first HTML5 browser; and prompting, by the first host via the HTML5 browser, a request for capturing the content data.

3. The method of claim 2, comprising:

accessing, by the first client via an application or a browser, the live broadcast website;

obtaining, by the first client via the application or browser, the streaming media data from the content distributor based on the HTTP;

converting, by the first client via the application or browser, the predetermined format of the streaming media data into a format corresponding to the application or browser and displayable on the first client; and displaying, by the first client via the application or browser, the streaming media data.

4. The method of claim 1, wherein the first HTML5 browser of the first host is capable of obtaining and displaying a content item that is captured by a second host among the plurality of hosts using a second HTML5 browser.

5. The method of claim 4, wherein the gateway server converts content data corresponding to the content item captured by the second host into streaming media data in the predetermined format.

6. A computing system for a web-based live broadcast in a network community:
   a plurality of hosts each configured to capture content data using a Hypertext Markup Language 5 (HTML5) browser and transmit the content data via the HTML5 browser to a gateway server based on a Web Real-Time Communication (WebRTC) protocol, wherein the content data comprise video and audio data;
   a gateway server configured to receive the content data from each of the plurality of hosts, convert the content data into streaming media data in a predetermined format, and transmit the streaming media data to a content distributor based on a Real-Time Messaging Protocol (RTMP), wherein the predetermined format is a Flash Video (FLV) format;
   a content distributor configured to receive the streaming media data from the gateway server and distribute the streaming media data in the network community;
   a plurality of clients each configured to receive the streaming media data from the content distributor based on a Hyper Text Transfer Protocol (HTTP), convert by themselves the predetermined format of the streaming media data into a format corresponding to each client and displayable on a corresponding client, and display the streaming media data, wherein a first client among the plurality of clients uses a program library of an HTML5 Flash Video Player in JavaScript (FLV.JS) to convert the predetermined format of the streaming data into the format that is displayable on the first client.

7. The computing system of claim 6, wherein a first host among the plurality of clients is further configured to access a webpage of a live broadcast website via a first HTML5 browser and prompt a request for capturing the content data via the first HTML5 browser, and wherein the webpage comprises instructions for calling a WebRTC facility of the first HTML5 browser.

8. The computing system of claim 7, wherein the plurality of clients each are configured to access the live broadcast website via an application or browser, obtain the streaming media data from the content distributor based on the HTTP via the application or browser, convert the predetermined format of the streaming media data into a format corresponding to the application or browser of each client and displayable on a corresponding client, and display the streaming media data via the application or browser.

9. The computing system of claim 7, wherein the first HTML5 browser of the first host is capable of obtaining and displaying a content item that is captured by a second host among the plurality of hosts using a second HTML5 browser and broadcasted in the network community.

* * * * *